United States Patent [19]

Bluege

[11] Patent Number: 4,927,790

[45] Date of Patent: May 22, 1990

[54] GLASS/FIBER COMPOSITE AND A METHOD OF ITS MANUFACTURE

[75] Inventor: John Bluege, Lake Park, Fla.

[73] Assignee: United Technologies Corporation, Hartford, Conn.

[21] Appl. No.: 287,566

[22] Filed: Dec. 19, 1988

Related U.S. Application Data

[63] Continuation of Ser. No. 86,343, Aug. 18, 1987, abandoned.

[51] Int. Cl.⁵ .............................................. C03C 14/00
[52] U.S. Cl. ......................................... 501/32; 501/80; 264/43
[58] Field of Search ............................. 501/32, 80, 35; 264/DIG. 19, 43; 65/22

[56] References Cited

U.S. PATENT DOCUMENTS 3,013,897 12/1961 Cupery et al. ..................... 501/80
4,397,961 8/1983 Snitzer et al. ..................... 501/32
4,412,854 11/1983 Layden ............................... 501/89
4,626,515 12/1986 Cotyung et al. ................... 501/87

Primary Examiner—Brian E. Hearn
Assistant Examiner—Andrew Griffis
Attorney, Agent, or Firm—Peter R. Ruzek

[57] ABSTRACT

A composite structure including fibers embedded in a silica glass matrix is made by first forming a precursor of the structure by embedding the fibers in a matrix of a silica-based glass material which further includes a glass-forming additive that lowers the working temperature range of the material below that of pure silica glass, and by leaching the additive out of the glass matrix material. The thus obtained porous glass matrix may then be consolidated at an elevated temperature that is considerably lower than that which would be needed for manufacturing the glass matrix directly from a material having substantially the same composition as the material of the leached-out glass matrix.

15 Claims, 1 Drawing Sheet

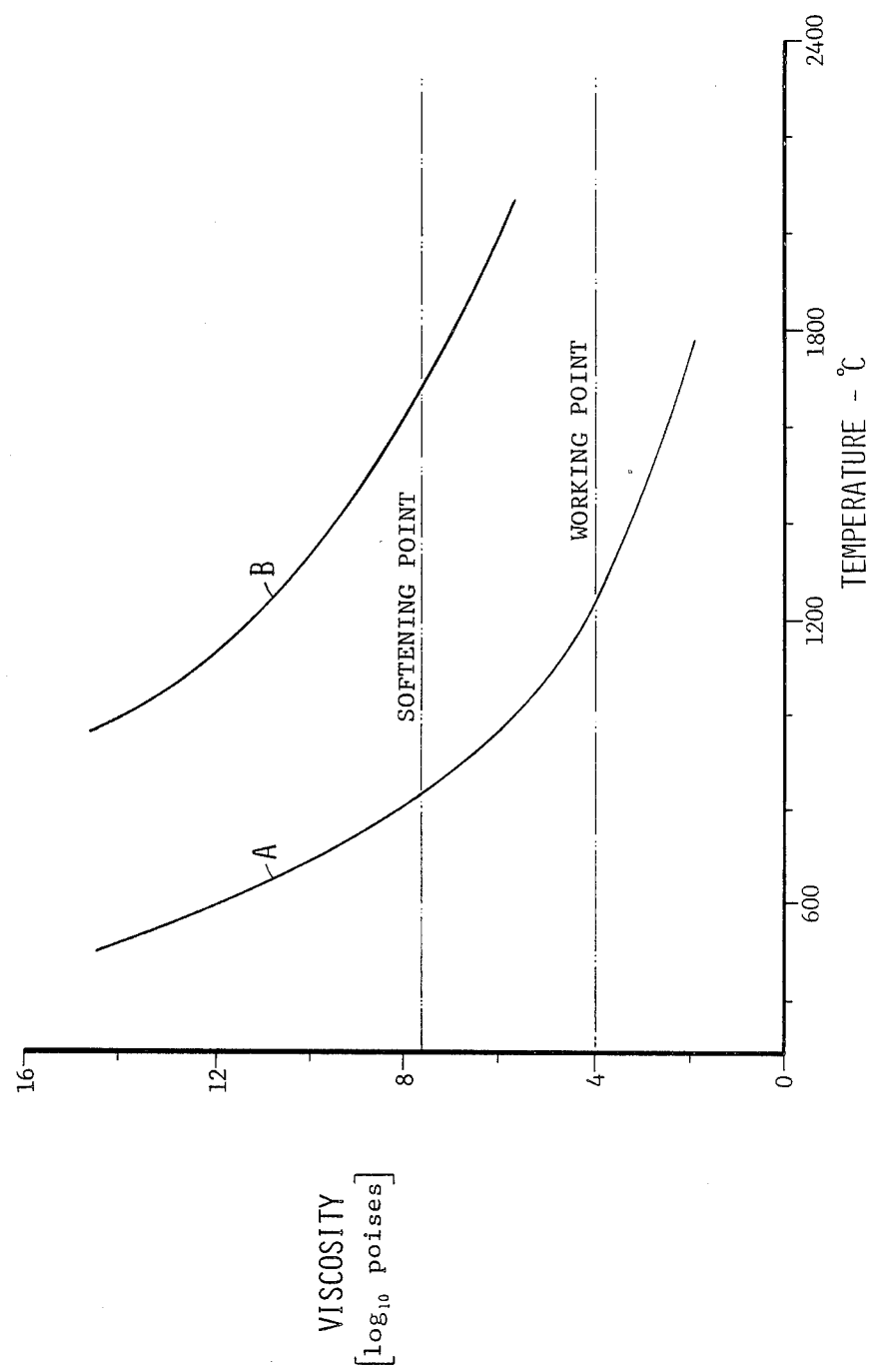

GLASS/FIBER COMPOSITE AND A METHOD OF ITS MANUFACTURE

This application is a continuation of Ser. No. 07/086,343, filed Aug. 18, 1987, now abandoned.

DESCRIPTION

1. Technical Field

The present invention relates generally to composite structures, and more particularly to a method of manufacturing a composite structure including optical fibers embedded in a glass matrix.

2. Background Art

Glass/fiber composites are finding an ever-increasing use in various fields of human endeavor, such as in jet engines, in advanced mirrors for use in optical systems, especially those using high-power lasers, in airplane components and in components to be used in space exploration and exploitation, to name just a few. Some of the reasons for the widespread acceptance and utilization of such composites, particularly those incorporating graphite fibers, are their capability of withstanding both relatively high and relatively low temperatures and considerable pressure differentials and their substantial rigidity and shape retention over a wide temperature range, coupled with their relatively low weight as compared to metals and metal alloys exhibiting similar stress and temperature response properties. Of particular interest are those materials which can be combined to form a composite exhibiting very low thermal expansion over a selected range. Such thermally stable composites are suitable for fabricating low distortion structures and optical components.

While such glass/fiber composites can be made from many different fiber and glass matrix material combinations, many of the more successful results have been achieved by using PYREX TM as the glass matrix material. Yet, glass materials of this type have relatively low softening temperatures of about 800° C., and this imposes a relatively low upper limit on the temperature range within which composite structures incorporating such glass material can be used. Also, unlike composites containing high silica contents glasses, such relatively low silica contents glasses cannot be readily polished or clad to form high-quality optical surfaces for mirrors effective for reflecting light in the visible range of the spectrum.

Therefore, it would be advantageous, especially for high temperature applications, to use as the matrix material a glass, such as substantially pure silica glass, with a softening temperature higher than that of the aforementioned glass material type. However, numerous problems, some of which may be difficult to surmount and require special and expensive measures, were encountered when it was attempted to employ substantially pure silica glass as the matrix material instead of the aforementioned glass material in the performance of the known method of making composite structures of the kind here under consideration. These difficulties are at least partially attributable to the very property which would make this glass material desirable for use in composite structures, that is, its relatively high softening temperature. This is so because the glass material must be heated to a much higher temperature than the previously used glass materials to bring it into intimate contact with the fibers and to cause it to fully embed the fibers. Such high temperatures not only require specialized expensive equipment and relatively high energy costs, but also make the glass matrix material incompatible with at least some fiber materials which would otherwise be available or desirable for incorporation in the composite structure. This, of course, is very disadvantageous.

Accordingly, it is a general object of the present invention to avoid the disadvantages of the prior art.

More particularly, it is an object of the present invention to develop a method of manufacturing composite structures incorporating fibers embedded in a matrix of a glass material having a relatively high softening temperature, which method does not possess the drawbacks of the heretofore known methods.

It is yet another object of the present invention to present a method of the above type which renders it possible to utilize temperatures significantly lower than those required previously to cause the high-melting glass to fully embed the fibers and to reduce oxidation of such fibers, especially carbon fibers, during the manufacture of the composite structure.

Still another object of the present invention is to devise a method of the above type which readily lends itself to scaling and to the fabrication of relatively large-size composite components using manufacturing equipment that is not currently available for the high-temperature approach.

A concomitant object of the present invention is to provide a composite structure of the above type having excellent strength and heat resistance properties, as well as improved thermal stability and polishability, due to the utilization of the method of the present invention in its manufacture.

DISCLOSURE OF THE INVENTION

The above objects and other which will become apparent hereafter are achieved in accordance with the present invention by first forming a precursor of the composite structure by embedding the fibers in a matrix of a silica-based glass material which further includes a glass-forming additive that lowers the working temperature range of the material below that of pure silica glass, and by leaching the additive out of the glass matrix material. The thus obtained porous glass matrix may then be consolidated at an elevated temperature which, however, is considerably lower than that which would be needed for manufacturing the glass matrix directly from a material having substantially the same composition as the material of the leached-out glass matrix.

BRIEF DESCRIPTION OF THE DRAWING

The sole FIGURE of the drawing is a diagrammatic representation of the dependency of the viscosities of two different glasses on temperature.

BEST MODE FOR CARRYING OUT THE INVENTION

Referring now to the drawing, it may be seen that reference characters A and B have been used therein to identify two curves each of which is representative of the dependency of the viscosity of a different glass on the temperature. The curve A is an example of a borosilicate glass, while the curve B is for fused silica glass. The graphic representation depicted in the drawing also indicates the viscosities which are commonly referred to in the glass manufacturing industry as the working and softening points. It will be appreciated that the working temperature ranges, that is, the temperature ranges for which the viscosities of the two glasses are at or below their softening points and preferably in the vicinity of their working points, are significantly different from one another. This means that the borosilicate glass can be worked (shaped, fused, consolidated) at a much lower temperature than the silica glass. By the same token, the resistance offered by the silica glass to high temperatures during the use of the composite structure is significantly better than that exhibited by the borosilicate glass, which is a very desirable feature; yet, it is very difficult and costly to use such silica glass directly in the production of composite structures, inasmuch as it would have to be heated to very high temperatures before it could be worked and this would bring about considerable difficulties in the direct production of the composite structures consisting of a multitude of juxtaposed layers of fibers embedded in a consolidated silica glass matrix.

In recognition of the above situation, it is proposed by the present invention to take advantage of the desirable features of both borosilicate and silica glasses while avoiding the undesirable ones, by using borosilicate glass in the formation of a precursor of the composite structure (thus making it possible to operate at relatively low temperatures during such formation), and subsequently leaching out (usually less than completely) the additive (boric oxide and usually at least one alkali oxide) which lowers the working temperature range of the glass being used below that of pure silica, to obtain a porous matrix of substantially pure silica glass which contains the fibers. It is to be understood that, where reference is being had herein to substantially pure silica glass, what is meant is a glass which contains predominantly silica and only so much of the additives as cannot be leached out of the matrix.

After the leaching, the porous matrix may be consolidated to obtain a solid and impervious glass matrix of silica glass fully encasing the fibers. This consolidation is achieved by heating the structure to a temperature in the range substantially between 800° and 1200° C., which is substantially below the temperature range (about 1600° to 2000° C.) that would be needed for directly forming the consolidated matrix structure of the silica glass having the same composition as that obtained in accordance with the present invention. The precursor may be formed by assembling sheets of the fibers, preferably graphite fibers permeated by the glass material and fusing these sheets at a temperature in a range substantially between 900° C. and 1300° C. Here again, this temperature range is significantly lower than that which would be needed for fusing sheets of fibers permeated by a glass material having the same composition as the final material of the glass matrix (i.e., substantially pure silica glass as defined above).

Most if not all of the glass materials which may be used in the performance of the method of the present invention, the operating parameters (temperatures, durations as related to particular thicknesses) and types and concentrations of leaching agents to be used are disclosed in U.S. Pat. No. 2,106,744 to which reference may be had for further details if needed to elucidate or complement the present disclosure. It is to be mentioned, however, that this patent deals with conversion of borosilicate glasses into silica glass only as employed in the production of glass containers and similar articles which do not incorporate any fibers. On the other hand, the present invention proposes to use the features disclosed in this patent in the fabrication of glass/fiber composites where this approach has never been used before, despite the fact that the subject matter of this patent has been in the public domain for decades and there is pronounced interest in the production of glass-/fiber composites that have high strength and resistance to very high temperatures.

It is to be mentioned further that, because of the presence of the fibers in the precursor as it is being subjected to the various treatment steps of the method of the present invention, the conversion of the borosilicate glass into the silica glass is facilitated as compared to that obtained in accordance with the above patent, inasmuch as the glass material of the matrix merely fills the interstices between the fibers and thus both the heat effect on, and the leaching of, the glass material are enhanced in comparison to those obtained in the absence of such fibers.

Furthermore, the presence of the fibers significantly improves heat conduction and removal during fabrication, allowing for the manufacture and processing of pieces of material that are larger than those which could be processed in the absence of the fibers. Moreover, the article obtained in accordance with the present invention has properties that are superior to those obtained by using prior art methods, especially since the lower temperatures used in the production thereof as compared to those that would be needed to produce the article directly from the material having the composition obtained in accordance with the present invention, and thus the avoidance of undue stressing of the components of the composite structure. Also, the lower fabrication temperatures also result in a smaller stress field due to the smaller temperature excursions between the final temperature encountered during the manufacture of the composite article and the temperatures to which the composite article is exposed during its use.

While the present invention has been illustrated and described as involving the conversion of one type of borosilicate glass into silica glass during the production of a composite structure, it will be appreciated that the present invention is not limited to this particular example; rather, the scope of protection of the present invention is to be determined solely from the attached claims.

I claim:

1. A method of manufacturing a composite structure that includes fibers embedded in a glass matrix, comprising the steps of:
    forming a precursor of the composite structure, including embedding the fibers in a matrix of silica-based glass material which contains a glass-forming additive that lowers the working temperature range of such material below that of pure silica; and
    chemically leaching the additive out of the precursor to obtain a porous matrix consisting substantially of silica and containing the fibers.

2. The method as defined in claim 1, wherein said additive includes boric oxide.

3. The method as defined in claim 2, wherein said additive further includes at least one alkali oxide.

4. The method as defined in claim 1, and further comprising the step of consolidating the porous matrix after said leaching step at an elevated temperature into a solid matrix fully enclosing the fibers.

5. The method as defined in claim 4, wherein said consolidating step includes heating the leached structure to a temperature in a range substantially between 800° and 1200° C.

6. The method as defined in claim 1, wherein said embedding includes assembling sheets of the fibers permeated by the material into the shape of the precursor, and firing the sheets into the precursor at a temperature in a range substantially between 900° and 1300° C.

7. The method as defined in claim 1, wherein said leaching step includes contacting the precursor with an acid capable of dissolving the additive.

8. A composite structure that includes fibers embedded in a glass matrix, obtained by a method comprising the steps of:

forming a precursor of the composite structure, including embedding the fibers in a matrix of silica-based glass material which contains a glass-forming additive that lowers the working temperature range of such material below that of pure silica; and chemically leaching the additive out of the precursor to obtain a porous matrix consisting substantially of silica and containing the fibers.

9. The structure as defined in claim 8, wherein said additive includes boric oxide.

10. The structure as defined in claim 9, wherein said additive further includes at least one alkali oxide.

11. The structure as defined in claim 8, wherein the method further comprises the step of consolidating the porous matrix after said leaching step at an elevated temperature into a solid matrix fully enclosing the fibers.

12. The structure as defined in claim 11, wherein said consolidating step includes heating the leached structure to a temperature in a range substantially between 800° and 1200° C.

13. The structure as defined in claim 8, wherein said embedding includes assembling sheets of the fibers permeated by the material into the shape of the precursor, and firing the sheets into the precursor at a temperature in a range substantially between 900° and 1300° C.

14. The structure as defined in claim 8, wherein said leaching step includes contacting the precursor with an acid capable of dissolving the additive.

15. The structure as defined in claim 8, wherein the fibers are of graphite.

* * * * *